US007575192B1

(12) United States Patent  
Kish (10) Patent No.: US 7,575,192 B1
(45) Date of Patent: Aug. 18, 2009

(54) TRANSMISSION SYSTEM FOR USE IN MICROTURBINE-POWERED APPLICATIONS (75) Inventor: Jules G. Kish, Milford, CT (US)

(73) Assignee: Locust USA, Inc., Miami, FL (US)

( * ) Notice: Subject to any disclaimer, the term of this patent is extended or adjusted under 35 U.S.C. 154(b) by 614 days.

(21) Appl. No.: 11/305,711

(22) Filed: Dec. 16, 2005

(51) Int. Cl.
B64D 35/00 (2006.01)
(52) U.S. Cl. ......................................... 244/60
(58) Field of Classification Search ............... 74/35, 74/416–417, 423; 180/65.2; 244/60, 17.11
See application file for complete search history.

(56) References Cited

U.S. PATENT DOCUMENTS

| | | | |
|---|---|---|---|
| 2,565,565 A * | 8/1951 | Landau et al. ................. | 74/432 |
| 3,351,304 A | 11/1967 | Stein et al. | |
| 3,540,311 A | 11/1970 | Chillson | |
| 3,954,029 A | 5/1976 | Wood | |
| 4,177,693 A | 12/1979 | Ivanko et al. | |
| 4,301,981 A | 11/1981 | Hartt | |
| 4,468,985 A | 9/1984 | Nilsson | |
| 4,484,491 A * | 11/1984 | Cocking ................... | 74/606 R |
| 4,590,820 A | 5/1986 | Hambric | |
| 4,649,307 A | 3/1987 | Bech | |
| 4,817,382 A | 4/1989 | Rudolph et al. | |
| 4,856,377 A | 8/1989 | Goudreau et al. | |
| 5,108,043 A | 4/1992 | Canavespe | |
| 5,149,311 A | 9/1992 | Luijten | |
| 5,271,295 A | 12/1993 | Marnot | |
| 5,572,910 A | 11/1996 | Tomaselli et al. | |
| 5,727,378 A | 3/1998 | Seymour | |
| 5,782,433 A | 7/1998 | Goi et al. | |
| 5,875,690 A | 3/1999 | Cognigni et al. | |
| 5,932,940 A * | 8/1999 | Epstein et al. ......... | 310/40 MM |
| 6,244,175 B1 * | 6/2001 | Lin et al. .................... | 101/216 |
| 6,246,138 B1 | 6/2001 | Nims | |
| 6,264,138 B1 | 7/2001 | Hawkins | |

(Continued)

OTHER PUBLICATIONS

Helical Gears, available from http://www.sdp-si.com/D190/D190cat.htm.

(Continued)

*Primary Examiner*—Tien Dinh
(74) *Attorney, Agent, or Firm*—Gordon & Jacobson, PC (57) ABSTRACT

A transmission system for use with a microturbine engine that includes an input shaft operably coupled to the output shaft of the microturbine engine. The output shaft of the microturbine engine and the input shaft of the transmission system operate at a rotational speed in a range between 50,000 and 250,000 RPM with an output power between 200 and 5 HP. The transmission system includes a gear train having a first gear that interfaces to a second gear, the first and second gears employing teeth with opposite handed helix-angled surfaces that apply axial forces to the input shaft during both normal operation and start-up operations, which pushes the input shaft toward the output shaft of the microturbine engine. Preferably, the helix-angled surfaces on respective normal drive sides of the teeth produce an axial force during normal operation that will not be overcome with the axial force produced by the mass time acceleration of the first gear. The gear train interfaces to a starter-generator preferably through the second gear. The gear train preferably provides a reduction ratio having a value greater than 24.

28 Claims, 9 Drawing Sheets

U.S. PATENT DOCUMENTS

| | | |
|---|---|---|
| 6,302,356 B1 | 10/2001 | Hawkins |
| 6,612,195 B2 | 9/2003 | Gmirya et al. |
| 6,676,073 B2 | 1/2004 | Thomassey |
| 6,896,080 B2 | 5/2005 | Takenaka |
| 2005/0121916 A1 | 6/2005 | Olsen et al. |
| 2005/0178892 A1 | 8/2005 | Box et al. |

OTHER PUBLICATIONS

High Reduction Ratio Drive System for Small Unmanned Aerial Vehicle (UAV); SBIR Solicitation A-02-073, dated 2002, available at www.acq.osd.mil/sadbu/sbir/solicitations/sbir022/army022.htm.

High Reduction Ratio Drive System for Small Unmanned Aerial Vehicle (UAV); SBIR Program Proposal, dated Aug. 13, 2002, by Locust, USA, Inc.

Selecting the Best Reduction Gear Concept for Prop-Fan Propulsion Systems; J. Godston (Pratt & Witney Aircraft) and J. Kish (Sikorsky Aircraft; AIAA/SAE/ASME 18th Joint Propulsion Conference, Jun. 1982, Cleveland, OH.

Internet article on "Miniature UAVs and MAVs"; In the Public Domain; vol. 1.2.0/14 of 16/Jan. 1, 2003/gvgoebel@earthlink.net/public domain.

2001 Cummins Power Generation, Microturbine Generator Set.

Sandia news release, Sandia microtransmission, Nov. 21, 1997.

Bowman Power, Bowman, Microturbine, Jul. 2002.

\* cited by examiner

FIG. 4A $\sum Fh = 0$ $Wr - Wr = 0$

$\sum Fv = 0$ $Wt - Wt = 0$

No resultant radial loads.

P51 Driving
(Normal Operation)

FIG. 4B $\sum Fh = 0$ $Wr - Wr = 0$ $\sum Fv = 0$ $Wt - Wt = 0$

No resultant radial loads.

P51 Driven
(Start-up)

TRANSMISSION SYSTEM FOR USE IN MICROTURBINE-POWERED APPLICATIONS

GOVERNMENT RIGHTS NOTICE

This invention was made under United States Government support under Contract DAAH10-02-C-0058 awarded by the U.S. Army. The United States Government has certain rights in the invention.

BACKGROUND OF THE INVENTION

1. Field of the Invention

This invention relates broadly to transmission systems. More particularly, this invention relates to transmission systems that transmit power from a microturbine engine.

2. State of the Art

Small low-cost unmanned air vehicles (UAVs) have been developed and deployed to carry out a variety of military roles such as reconnaissance and attack missions. Currently, intermittent combustion piston engines of 100 HP (or less) power all of the low speed UAV aircraft. Most of these engines drive propellers without the need for a gearbox. However, these engines burn gasoline, which is highly flammable and thus undesirable for field service operations. Piston engines also have undesirable vibration characteristics and are difficult to start in cold weather operations.

Locust USA, Inc of Miami, Fla., assignee of the present invention has developed a microturbine engine and gearbox for use in UAVs. The microturbine engine, when used in conjunction with heavy jet fuel (such as JP-8 fuel), provides a highly advantageous propulsion system for UAVs due to its lighter weight, use of less flammable fuels, higher reliability and reduced vibrations. Microturbine engines operate at very high rotational speeds, typically in the range between 50,000 RPM and 250,000 RPM with an output power between 200 HP and 5 HP. UAVs operate at much slower propeller rotational speeds, typically on the order of 2000 RPM to 7000 RPM. These constraints dictate that the gearbox provide a reduction ratio on order of 25:1 to 36:1 over the RPM range and horsepower range of the microturbine engine.

In the current Locust designs, two different types of spline drive couplers as well as two different types of axial retention mechanisms can be used to couple the output of the microturbine engine to the input of the gear box. The two spline drive coupler types include an outside diameter piloted spline coupler (sometimes referred to as a "flat root major diameter fit spline coupler") and a polygon spline coupler. The two types of axial retention mechanism include a snap ring and set screws.

Figure 1A:
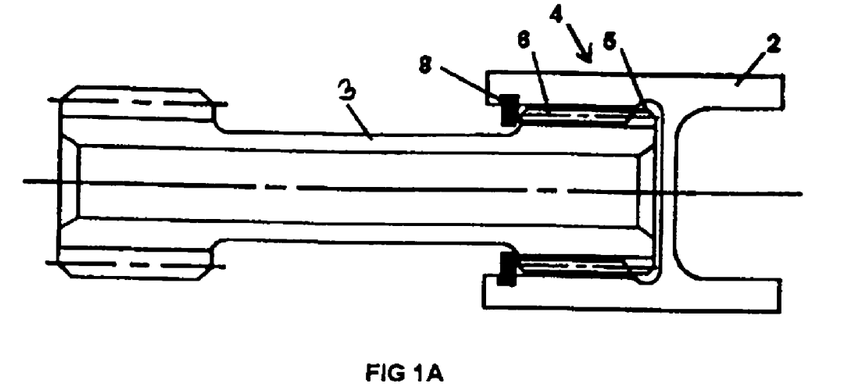
FIG. 1A is a cross-section illustrating a prior art outside diameter piloted spline coupler and snap ring that together can be used to couple the output shaft of a microturbine engine to the input shaft of a speed-reducing transmission system.
Figure 1B:
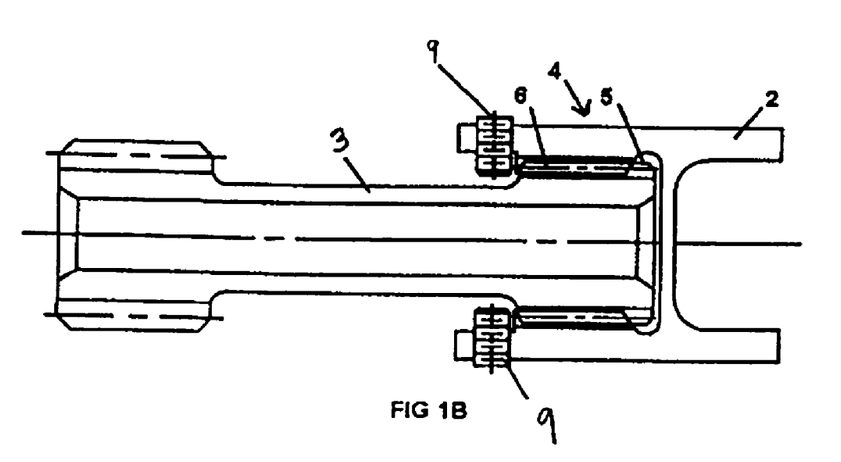
FIG. 1B is a cross-section illustrating a prior art outside diameter piloted spline coupler and set screws that together can be used to couple the output shaft of a microturbine engine to the input shaft of a speed-reducing transmission system.

FIGS. 1A and 1B illustrate an outside diameter piloted spline coupler wherein the output spline 2 of the microturbine engine includes projections 6 that project radially inward from the inner diameter surface to engage the piloted section 5 of the input shaft 3 of the gear box. The outside diameter piloted spline coupler is well suited for the high RPM speeds produced by the microturbine engine. Moreover, the axial travel of the input shaft 3 relative to the output spline 2 that is permitted by the outside diameter piloted spline coupler provides for simple and efficient assembly and disassembly of the coupling between the engine and the gear box.

In the configuration of FIG. 1A, a snap ring 8 is disposed within an annular groove in the inner diameter surface of the output spline 2 and projects radially inward to engage the input shaft 3 in a manner that limits the axial travel of the input shaft 3 relative to the output spline 2. The snap ring 8 is problematic because it is very difficult to assemble due to the fact that the snap ring is "trapped" in a small annular groove on the outside diameter surface of the input shaft 3.

In the configuration of FIG. 1B, set screws 9 are screwed through holes that pass from the outside diameter surface to the inside diameter surface of the output spline 2 and project radially inward to engage the input shaft 3 in a manner that limits the axial travel of the input shaft relative to the output spline 2. The set screws 9 are easier to install than the snap ring but can present problems with unbalance at very high engine speeds and are prone to wear.

Figure 1C:
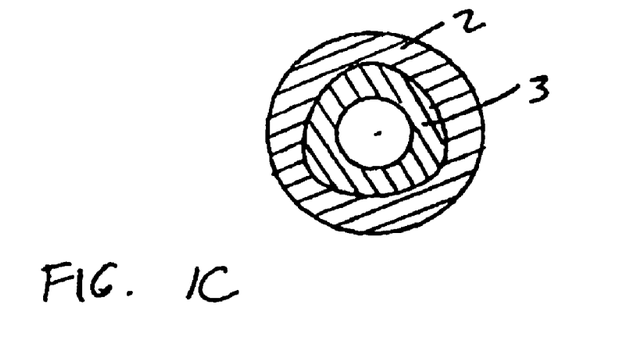
FIG. 1C is a cross-section illustrating a prior art tri-lobe polygonal spline coupler that can be used to couple the output shaft of a microturbine engine to the input shaft of a speed-reducing transmission system.

In small size applications, it may be difficult to manufacture the teeth (projections) of the inside diameter piloted spline coupler. As an alternative in such small size applications, a polygonal spline coupler as shown in FIG. 1C can be used. This exemplary polygonal spline coupler employs a three-lobe polygonal design. This design can be manufactured by very accurate grinding of the polygonal system to produce accurate fits.

Thus, there remains a need in the art to provide a mechanism for coupling a microturbine engine to a gear box in a manner that is easy to assemble and disassemble while also providing for improved reliability, and to incorporate such a mechanism in a small lightweight propulsion system for use in UAVs.

SUMMARY OF THE INVENTION

It is therefore an object of the invention to provide an improved mechanism for coupling a microturbine engine to a transmission system which is reliable and easy to assemble and disassemble.

It is another object of the invention to employ the improved coupling mechanism as part of a lightweight and small-sized propulsion system.

It is yet another object of the invention to employ the improved coupling mechanism as part of a lightweight and small-sized propulsion system for aircraft applications.

It is another object of the invention to employ the improved coupling mechanism in conjunction with a microturbine whose output shaft is operating in a range between 50,000 RPM and 250,000 RPM with an output power between 200 HP and 5 HP.

It is a further object of the invention to employ the improved coupling mechanism in conjunction with a transmission system that provides a reduction ratio preferably greater than 24, which is suitable for fixed-wing UAV applications. A lower reduction ratio (e.g., on the order of 9:1) is preferred for vertical-lift UAV applications where a speed-reducing bevel gear is used.

In accord with these objects, which will be discussed in detail below, an unmanned air vehicle (UAV) is provided which uses a microturbine engine for propelling an aircraft via a transmission system. The aircraft may be a fixed-wing aircraft, a vertical lift aircraft, or a hybrid tilt-rotor aircraft. The output spline of the microturbine engine is coupled to the input shaft of the transmission system preferably by a coupling that permits axial travel of the output spline relative to the input shaft but does not permit radial movement (e.g., an outside diameter piloted spline coupler, which is sometimes referred to as a flat root major diameter fit spline coupler, or a polygonal spline coupler). A retention clip may be used to limit such axial travel when the microturbine engine is off. The output spline of the microturbine engine and the input shaft of the transmission preferably operate at a rotational speed in an extended range between 50,000 RPM and 250,000 RPM with an output power between 200 HP and 5 HP. The transmission system includes a gear train which is coupled to the input shaft. The gear train includes a first gear and a second gear that interface to one another. The first gear is mounted on the input shaft and rotates in the same direction as the input shaft. The second gear is mounted on a counter-rotating shaft and thus rotates in the opposite direction as the input shaft. The output of the transmission system is derived from the counter-rotating shaft and is operably coupled to the propeller of the aircraft. The first and second gears are also operably coupled to the output of a starter-generator which is employed during start-up where the generator is used as a motor for starting.

In the preferred embodiment, the starter-generator is realized by a brushless 4-pole permanent magnet AC type architecture with a plurality (e.g., 4) magnets mounted around a rotor perimeter. A power control unit converts the alternating current output to a direct current output in a first mode, which is employed during normal operation to generate DC current for supply to the electrical components of the aircraft. The power control unit also converts the direct current input (from a battery) to an alternating current input in a second mode, which is employed during start-up.

The first and second gears operate differently in these two distinct modes. In the first mode (normal operation), the output spline of the microturbine engine drives the input shaft and the first gear of the transmission system, which in turn drives the second gear and the starter-generator coupled thereto. In the second mode (start-up), the starter/generator drives the second gear, which in turn drives the first gear, the input shaft of the transmission system and the output spline of the microturbine engine coupled thereto. The first and second gears employ teeth that have opposite handed helix-angled surfaces on the respective normal drive sides and normal coast sides of the teeth. These helix-angled surfaces apply an axial force to the input shaft in both the first mode (normal operation) and the second mode (start-up operation) that pushes the input shaft toward the output spline of the microturbine engine. In the preferred embodiment, the helix-angled surfaces on the respective normal drive sides of the teeth are designed so as to produce an axial force in the first mode (normal operation) that will not be overcome with the axial force produced by the mass times acceleration of the first gear.

It will be appreciated that the axial pushing force applied by the helix-angled surfaces of the teeth of the first and second gears controls the axial travel of the output spline relative to the input shaft without the use of a set screw or other awkward retention mechanism. The omission of the set screw or other awkward retention mechanism makes assembly and disassembly simple and efficient while providing improved reliability.

In the preferred embodiment, the transmission system employs a two-stage compound-idler design that provides a reduction ratio preferably greater than 24. Alternatively, the transmission system may comprise any one (or parts of) of a number of configurations, including an in-line lay shaft configuration, an in-line star-star configuration, or an offset star-spur configuration. Such configurations preferably provide a reduction ratio having a value preferably greater than 24 for fixed-wing UAV applications. A lower reduction ratio (e.g., on the order of 9:1) is preferred for vertical-lift UAV applications where a speed-reducing bevel gear is used.

According to one embodiment of the invention, the radial loads applied to the first gear are self-equilibrating such that input shaft of the transmission system can be supported without bearings.

According to other embodiments of the invention, the transmission system and microturbine-based propulsion system of the present invention may be readily adapted for use in other applications, such as marine propulsion systems, automotive applications, electrical power generation applications, micro-turbine based HVAC applications and hydraulic applications. Moreover, the microturbine-based propulsion system of the present invention may consume a wide variety of fuels, including liquid fuels (such as liquefied natural gas) or gaseous fuels (such as natural gas or propane).

Additional objects and advantages of the invention will become apparent to those skilled in the art upon reference to the detailed description taken in conjunction with the provided figures.

BRIEF DESCRIPTION OF THE DRAWINGS

FIGS. 5A and 5B are schematic diagrams illustrating the axial force applied by the teeth of the input pinion and drive gear of the input stage of the offset compound idler configuration of FIGS. 3A and 3B during normal operation (where the input pinion drives the drive gears); FIG. 5A illustrates the configurations of the helical teeth for clockwise rotation of the engine output shaft and transmission input shaft and FIG. 5B illustrates the configurations of the helical teeth for counter-clockwise rotation of the engine output shaft and transmission input shaft.

FIGS. 6A and 6B are schematic diagrams illustrating the axial force applied by the teeth of the input pinion and drive gear of the input stage of the offset compound idler configuration of FIGS. 3A and 3B during start-up operation (where the input pinion is driven by the drive gears); FIG. 6A illustrates the configurations of the helical teeth for clockwise rotation of the engine output shaft and transmission input shaft and FIG. 6B illustrates the configurations of the helical teeth for counter-clockwise rotation of the engine output shaft and transmission input shaft.

DETAILED DESCRIPTION OF THE PREFERRED EMBODIMENTS

Figure 2A:
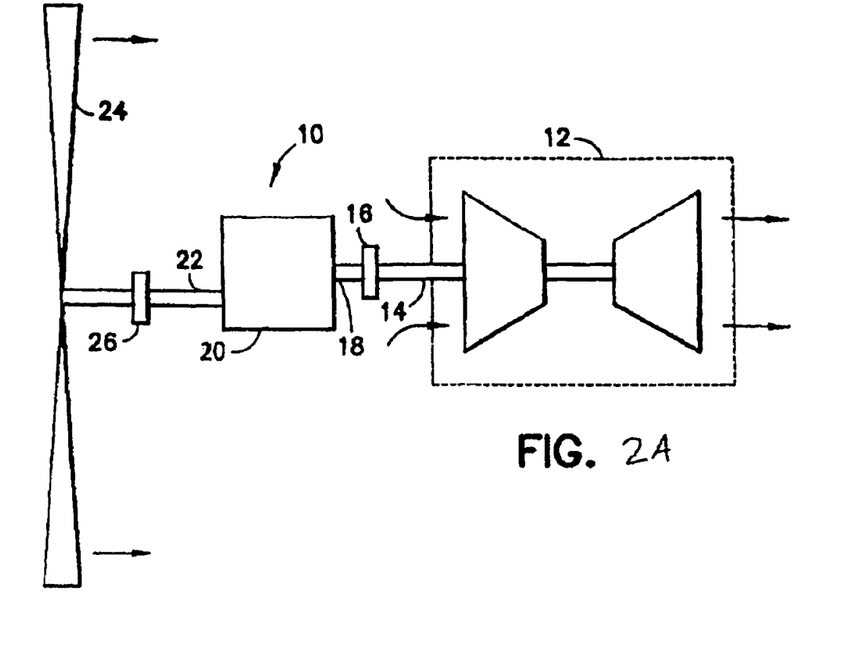
FIG. 2A is a schematic diagram of a propeller-based propulsion system, including a microturbine engine and transmission system in accordance with the present invention.

Turning now to FIG. 2A, there is shown a power plant 10 suitable for use in propelling a fixed-wing aircraft. The power plant 10 includes a microturbine engine 12 with an output shaft 14. An example of such a microturbine engine is disclosed in detail in U.S. Pat. No. 5,727,378 to Seymour, hereinafter incorporated by reference in its entirety. A coupling mechanism 16 couples the output shaft 14 to the input shaft 18 of a transmission system 20. The transmission system 20 operates to reduce the speed of the output shaft 14 of the microturbine engine 12 at its own output shaft 22. The output shaft 22 of the transmission system is coupled to a propeller 24 by a coupling mechanism 26. The propeller 24, when driven by the microturbine engine 12 and transmission system 20, provides thrust that propels an aircraft body. Note that in the configuration shown in FIG. 2A, the transmission system 20 and propeller 24 are disposed on the intake side of the microturbine engine 12. This configuration allows the transmission system to be cooled by the engine inlet air. Alternatively, the transmission system 20 and propeller 24 may be disposed on the exhaust side of the microturbine engine 12 as best shown in the unmanned fixed-wing aircraft of FIG. 2B. In this alternate configuration, the transmission system and propeller must operate in a hot environment, and thus must be designed to endure the increased thermal loading that stems from operation in the hot environment on the exhaust side of the engine 12.

The output shaft 14 of the microturbine 12 and the input shaft 18 of the transmission system operate at very high rotational speeds, preferably in the range between 50,000 RPM and 250,000 RPM with an output power between 200 HP and 5 HP. For low-speed UAV applications, the propeller 24 operates at much slower rotational speeds, typically on the order of 2000 RPM to 7000 RPM. These constraints result in a required reduction ratio from the microturbine engine RPM to the propeller RPM on the order of 25:1 to 36:1. The transmission system 20 provides this required speed reduction over the output power range (200 HP to 5 HP) of the microturbine engine 12. In the preferred embodiment of the present invention, the transmission system 20 as well as the microturbine engine 12 are of small size and low weight, and thus suitable for use in advanced UAVs.

Figure 2B:
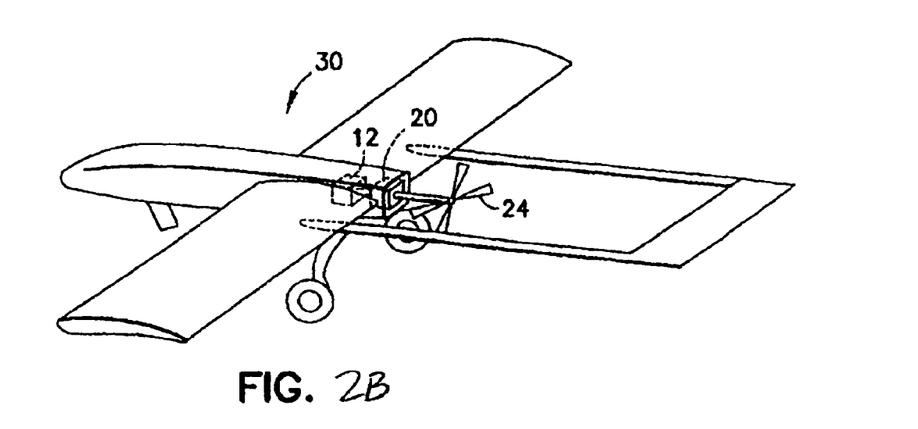
FIG. 2B is a pictorial illustration of an exemplary fixed-wing UAV that employs the propeller-based propulsion system of FIG. 2A in accordance with the present invention.
Figure 3A:
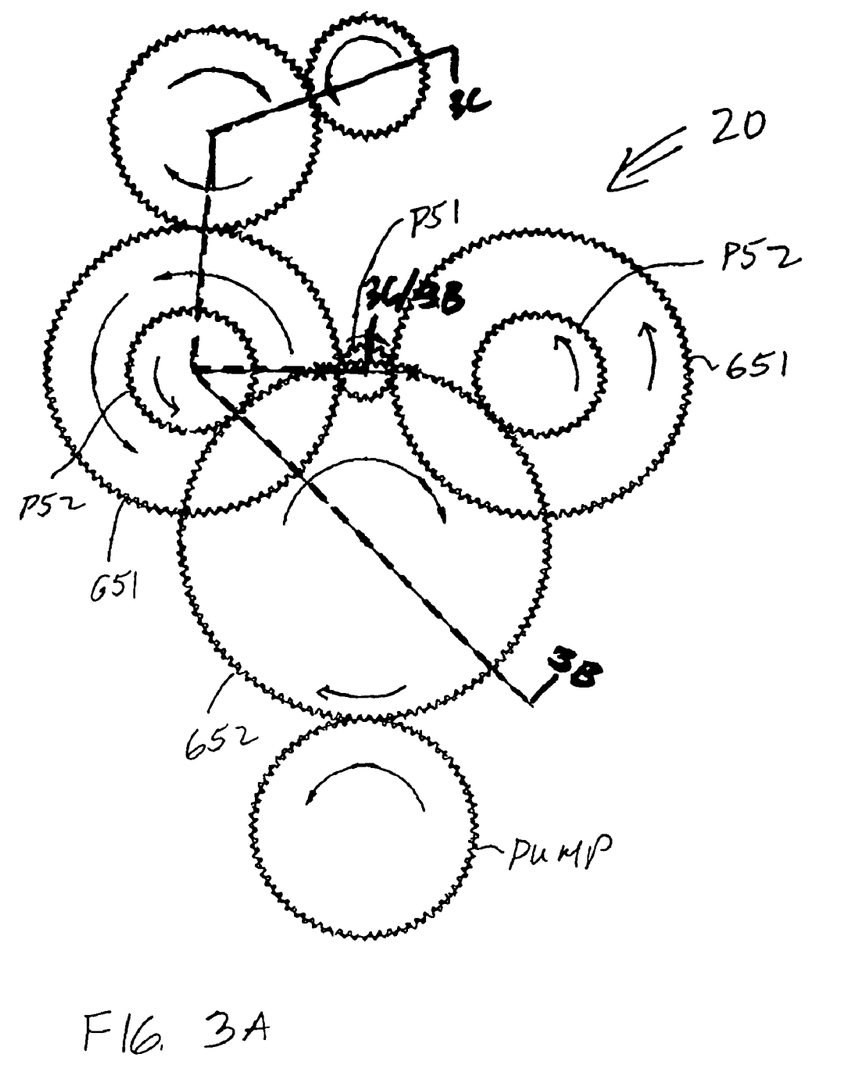
FIG. 3A is a schematic diagram depicting an illustrative embodiment of the transmission system of FIGS. 2A and 2B, which is realized by a two stage offset compound idler configuration in accordance with the present invention.
Figure 3B:
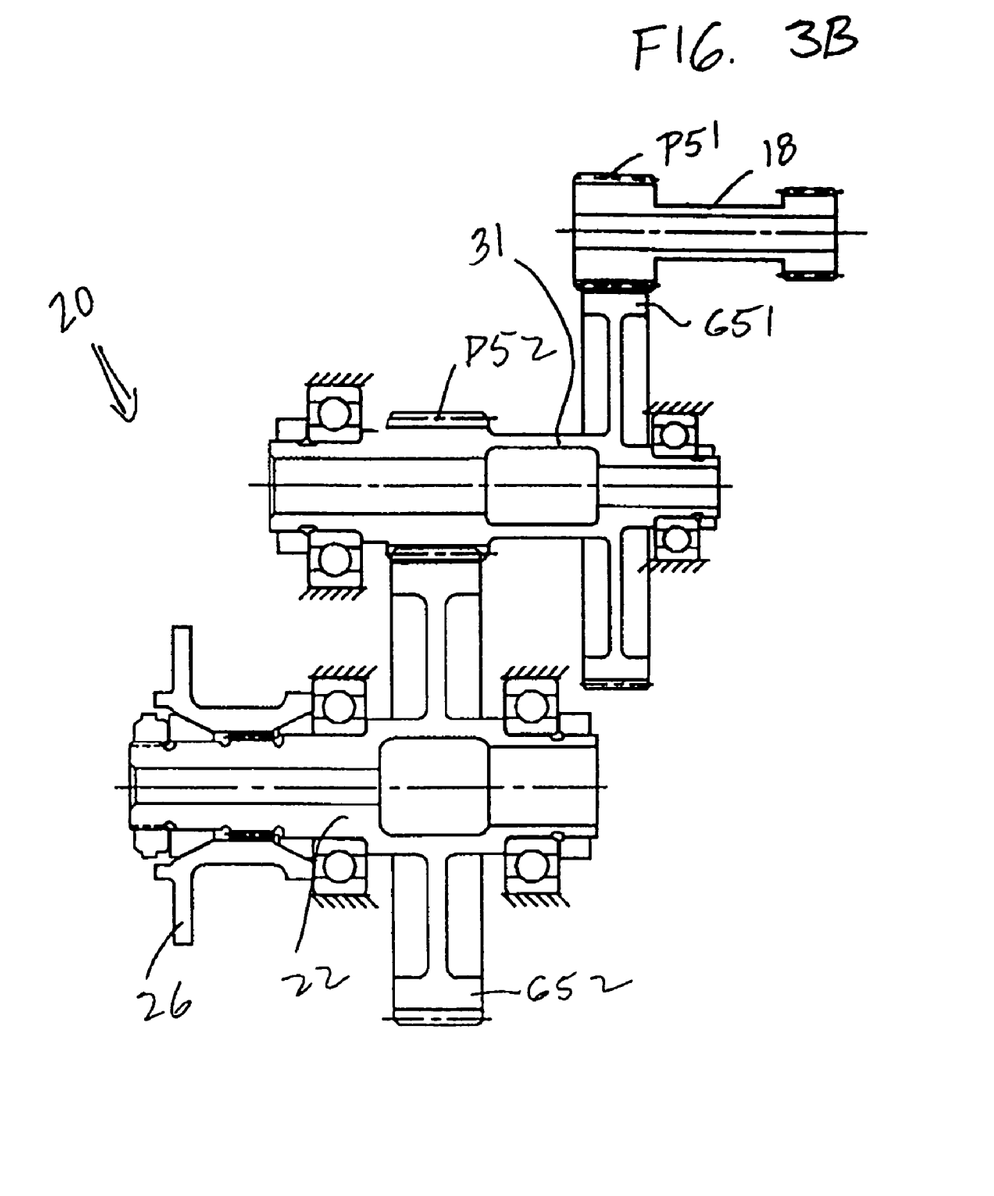
FIG. 3B is a cross-section depicting the major drive train gears of the offset compound idler configuration of FIG. 3A.

FIGS. 3A and 3B illustrate an exemplary embodiment of the transmission system 20 of FIGS. 2A and 2B, which is realized as a two-stage Offset Compound Idler configuration. The first stage of this Offset Compound Idler configuration includes an input pinion P51 that interfaces to two diametrically opposed gears G51. Each gear G51 is connected to a corresponding intermediate shaft 31 with a second stage pinion P52 that combines to drive a single output gear G52. The output gear G52 of the second stage is offset from the input pinion P51 (FIG. 3A). This offset is possible geometrically because the center distance of the second stage is larger that the center distance of the first stage. The intermediate shafts 31 for the two gears G51 and two pinions P52 (one shown in the cross section of FIG. 3B) as well as the spline coupled to the output shaft 22 are supported by bearings as shown. The input pinion P51 is integral with the input shaft 18 and rotates in the same direction as the input shaft 18. The two gears G51 are integral with the counter-rotating intermediate shafts 31 and thus rotate in the opposite direction as the input shaft 18. The rotational output of the transmission system 20 is derived from the counter-rotating shafts 31 via the interface between the pinions P52 and the output gear G52.

Figure 3C:
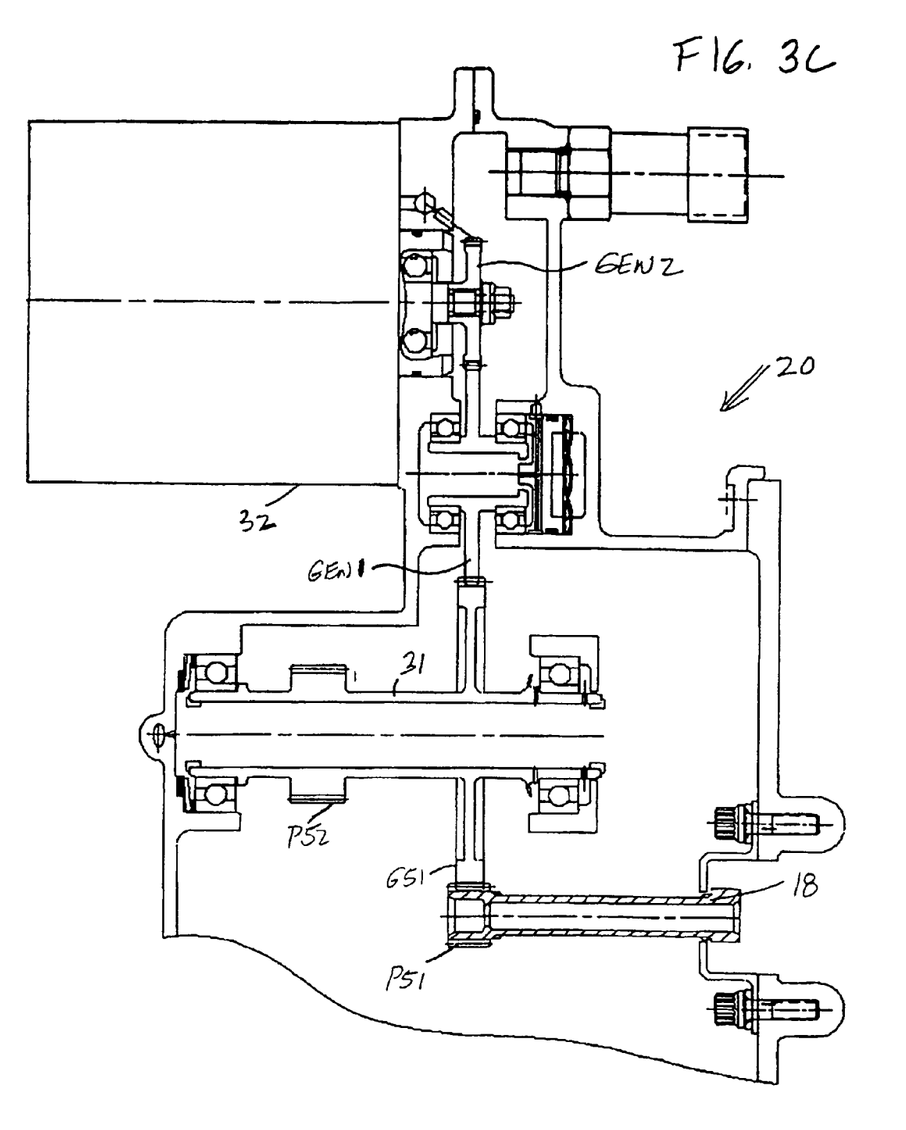
FIG. 3C is a schematic illustration of the first stage of the gearing of FIG. 3A showing the input pinion, input drive gear, generator idler gear and generator drive gear along with the generator.

As best shown in FIG. 3C, a starter-generator 32 interfaces to the one of the G51 gears via an idler gear GEN1 and a pinion gear GEN2. Preferably, the GEN1 idler gear interfaces to the G51 gear such that the generator has proper clearance and mounts more or less on the transmission centerline. This geometry is selected (as compared to a load canceling geometry) because the generator loads are small compared to the normal engine drive loads. The GEN1 idler gear allows for clearance between the body of the starter-generator 32 and the transmission housing. Preferably, the GEN2 pinion gear has more teeth than the P51 pinion such that the RPM of the starter-generator 32 is slower than engine speed. In the preferred embodiment, the starter-generator 32 is realized by a brushless 4-pole permanent magnet AC type architecture with a plurality (e.g., 4) of magnets mounted around a rotor perimeter. A power control unit converts the alternating current output to a direct current output in a first mode, which is employed during normal operation to generate DC current for supply to the electrical components of the aircraft. The power control unit converts the direct current input (from a battery) to an alternating current input in a second mode, which is employed during start-up. The P51 pinion gear and the G51 gears operate differently in these two distinct modes. In the first mode (normal operation), the output spline 14 of the microturbine engine 12 drives the input shaft 18 and the pinion gear P51 of the first stage, which in turn drives the G51 gears and the starter-generator 32 coupled thereto via gears GEN1 and GEN2. In the second mode (start-up), the starter/generator 32 drives one of the G51 gears through the GEN2 and GEN1 gears, which in turn drives the pinion gear P51, the input shaft 18 and the output spline 14 of the microturbine engine 12 coupled thereto.

Figure 3D:
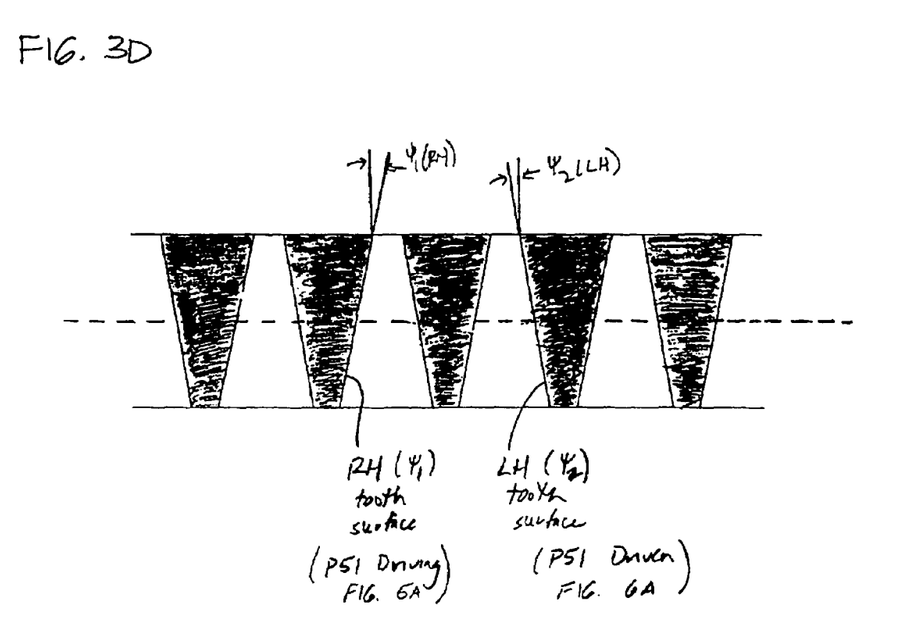
FIG. 3D is a schematic illustration of the dual helix-angled surfaces of the teeth of the input pinion gear of FIGS. 3A-3C in accordance with an exemplary embodiment of the present invention; the drive gears that interface to the input pinion each employ teeth with dual helix-angled surfaces having opposite-handed configuration with respect to those of the input pinion gear.
Figure 5A:
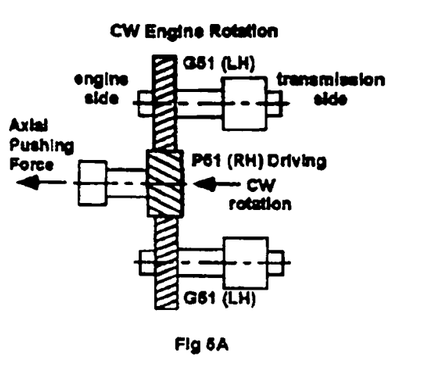
Figure 5B:
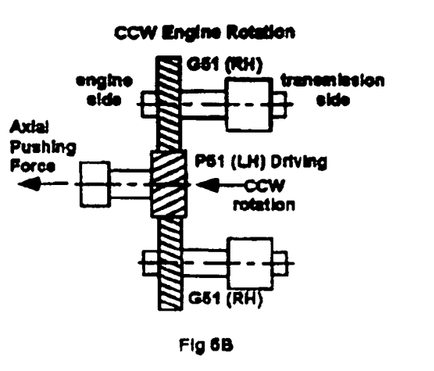
Figure 6A:
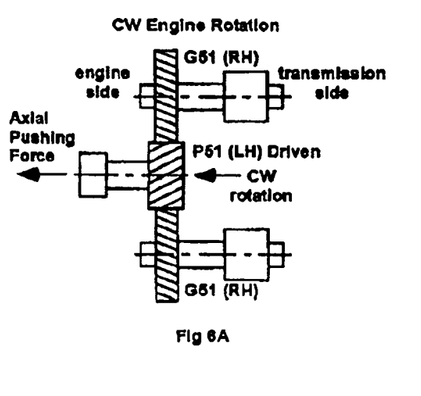
Figure 6B:
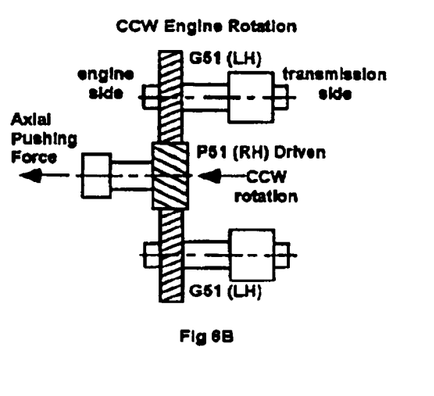

In accordance with the present invention, the pinion gear P51 employs teeth that have opposite handed helix-angled surfaces on the respective normal drive sides and normal coast sides of the teeth (e.g., one of the helix-angled surfaces having a right-handed orientation and the other helix-angled surface having a left-handed orientation) as shown in FIG. 3D. The G51 drive gears also employ teeth that have opposite handed helix-angled surfaces on the respective normal drive sides and normal coast sides of the teeth (e.g., one of the helix-angled surfaces having a right-handed orientation and the other helix-angled surface having a left-handed orientation). The pinion gear P51 and the G51 drive gears are in essence helical gears but the helix angles are so small that they may be considered spur gears with helix corrections. During the normal mode of operation (with the microturbine engine driving the transmission system) as shown in FIGS. 5A and 5B for two different engine rotation directions, the helix-angled surfaces of the teeth induce axial loads that push the input shaft 18 toward the output shaft 14 of the microturbine engine 12. In FIG. 5A, the pinion P51 employs teeth with right-handed helix-angled surfaces on their normal drive side, the G51 gears employs teeth with left-handed helix-angled surfaces on their normal drive side, and the input shaft 18 is driven against the microturbine output shaft 14 when the engine drives clockwise as viewed in the figure. In FIG. 5B, the pinion P51 employs teeth with left-handed helix-angled surfaces on their normal drive side, the G51 gears employ teeth with right-handed helix-angled surfaces on the normal drive side, and the input shaft 18 is driven towards the microturbine output shaft 14 when the engine is driving counter clockwise as viewed in the figure. During the start-up mode of operation (where the generator 32 drives the transmission system 20 and the microturbine engine) as shown in FIGS. 6A and 6B for two different engine rotation directions, the helix-angled surfaces of the teeth induce axial loads that push the input shaft 18 toward the output shaft 14 of the microturbine engine 12. In FIG. 6A, the pinion P51 employs teeth with left-handed helix-angled surfaces on their normal coast side, the G51 gears employ teeth with right-handed helix-angled surfaces on their normal coast side, and the input shaft 18 is driven against the microturbine output shaft 14 when the engine is driven clockwise as viewed in the figure. In FIG. 6B, the pinion P51 employs teeth with right-handed helix-angled surfaces on their normal coast side, the G51 gears employ teeth with left-handed helix-angled surfaces on their normal coast side, and the input shaft 18 is driven towards the microturbine output shaft 14 when the engine is driven counter clockwise as viewed in the figure. In these configurations, the helical teeth of the input pinion P51 and the G51 drive gears employ the construction of FIGS. 5A and 6A for clockwise engine rotation or the construction of FIGS. 5B and 6B for counter-clockwise engine rotation. During normal operation, the axial pushing force produced by the helix-angled surfaces on the normal drive side of the teeth forces the input shaft 18 to operate in contact with the microturbine output shaft 14 with the splined connection 4 transmitting torque and the axial retention provided by the axial load produced. Suring start-up, the axial pushing force produced by the helix-angled surfaces on the normal coast side of the teeth also forces the input shaft 18 to operate in contact with the microturbine output shaft 14 with the splined connection 4 transmitting torque and the axial retention provided by the axial load produced. Thus, during both normal operation and startup, the helix-angled surfaces on opposite sides of the teeth provides thrust on the input shaft 18 in a direction so as to force the input shaft 18 towards the microturbine output shaft 14. The omission of the set screw, retention ring, or other awkward retention mechanism makes assembly and disassembly simple and efficient while providing improved reliability.

In the preferred embodiment, the helix-angled surfaces of the teeth are designed so as to produce an external force during normal operation that will not be overcome with the axial force produced by the mass times acceleration of the input pinion P51. In the illustrative embodiment of FIGS. 3A and 3B, the GEN1 and GEN2 gears also employ helical teeth. The helical teeth of the GEN1 gear is of opposite hand to the helical teeth of the G51 gear on opposite tooth sides. The helical teeth of the GEN2 gear is of opposite hand to the helical teeth of the GEN1 gear on opposite tooth sides. However, in alternate embodiments, it is contemplated that the GEN1 and GEN2 gears can be realized by spur gears that interface to the drive train via a spur gear interface.

Figure 4A:
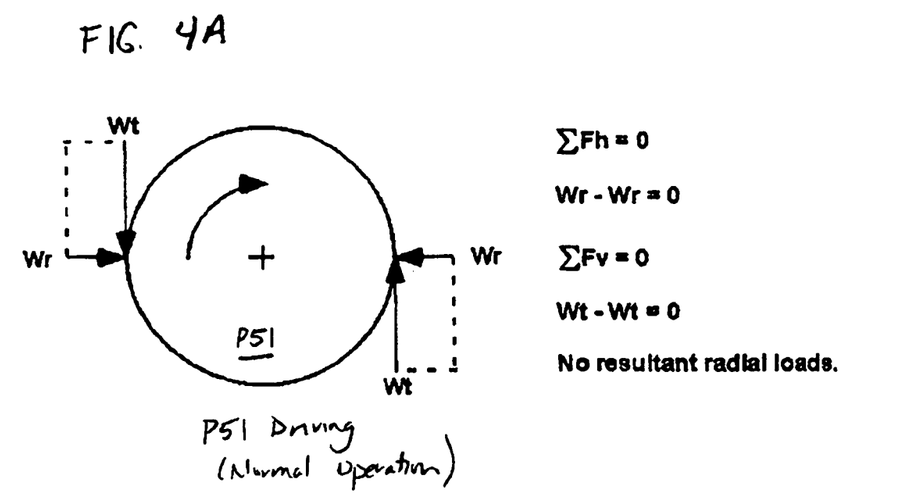
FIGS. 4A and 4B are schematic diagrams illustrating the principles of a self-equilibrating input stage for the offset compound idler configuration of FIGS. 3A-3C.
Figure 4B:
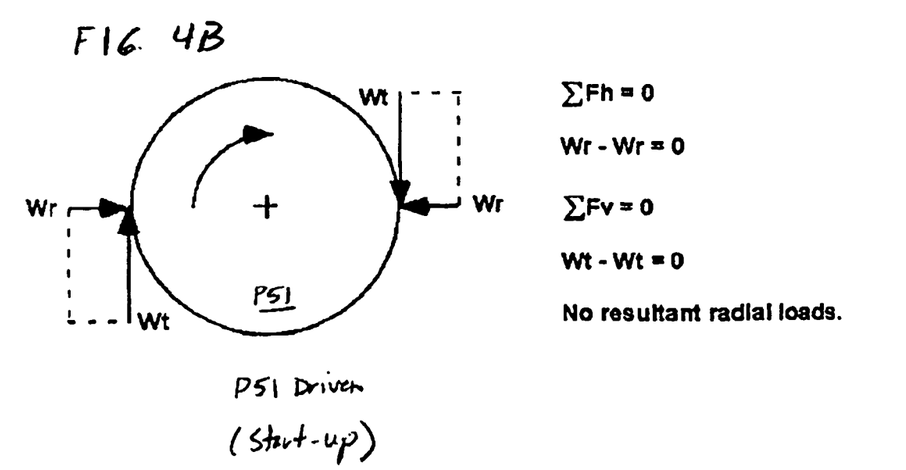

Another consideration for the design of the transmission system of the present invention is the high speed operation of the input shaft 18. It is very difficult to designs bearings suitable for use with radial loads at such high speeds. Thus, it is an objective to have the input shaft of the transmission carry only torque and have no radial load (and if possible have no bearings). In order to reduce the radial load on the input shaft 18, it is preferable that the first stage of the transmission system 20 provide for self-equilibration. This condition is provided by equally spacing apart the G51 gear interfaces about the circumference of the input pinion P51 such that the resultant radial load on the input pinion P51 is cancelled out. FIGS. 4A and 4B illustrate the physics provided by a self-equilibrating configuration for the input pinion P51 in both the normal operation mode (where the input pinion P51 is driving the G51 gears) and the start-up mode (where the input pinion P51 is driven by the G51 gears). In this configuration, the input drive shaft 18 of the transmission system 20 need not be supported by high speed bearings, thereby eliminating the requirement of loaded bearings at high speeds. Also of note in FIGS. 4A and 4B is the fact that opposite sides of the teeth of the input pinion gear P51 are loaded depending on the driving (normal) or driven (start-up) mode of operation.

In the embodiments described above, the helix-angled surfaces of the teeth of the input pinion P51 and the G51 drive gears are preferably designed so as to produce an axial force during normal operation that will not be overcome with the axial force produced by the mass times acceleration of the input pinion P51. In the preferred embodiment, the input pinion has a weight on the order of 0.052 pounds, has a pitch diameter $d_{P51}$ of 0.6038 inches, and is driven at a maximum RPM of 104,600 at a horsepower of 70. It is reasonable to assume that the input pinion will experience a maximum of 20 g acceleration at maximum power conditions. Thus, the maximum axial load on the input pinion due to mass times acceleration of the input pinion is on the order of 20*0.052=1.04 pounds. The maximum RPM and horsepower dictate that the input pinion experiences a torque $T_{P51}$ of (63025*70)/104,600=42.2 inch pounds. Substituting the tangential and axial loads per side gives a tangential tooth load per side $Wt_{P51}$ of $(2*T_{P51})/(2*d_{P51})$=69.9 lbs. The helix angle $\psi$ of the helical teeth can be derived from the tangential tooth load per side $Wt_{P51}$ and the axial tooth load per side $Wa_{P51}$ as follows:

$$\psi = \arctan \frac{Wa_{P51}}{Wt_{P51}}.$$

Because there are two tooth contact points (on opposite sides of the input pinion), the 1.04 pound axial load is distributed over these two points to provide an axial tooth load per side of $Wa_{P51}$ of 1.04/2=0.52 pounds. Substituting in the tangential and axial tooth loads per side provides a helix angle $\psi_1$ on the normal drive side of the teeth of 26 minutes. At start-up, there will be no g forces acting upon the input pinion and thus only a small helix angle correction is required on the normal coast side of the teeth (which carry the load during the start-up/input pinion driven mode of operation) in order to push the input shaft 18 toward the engine output spline 18. Thus, the helix angle $\psi_2$ on the normal coast side of the teeth of the input pinion P51 and the G51 drive gears may be different. For example, the 26 minute helix angle represents a slope of approximately 0.007 inches/inch. Since the minimum face width is 0.25 inches, each gear tooth will be thinned by 0.25*0.007=0.002 inches. In this example, the helix angle $\psi_2$ on the normal coast side of the teeth can be selected so as to produce a 0.001 inch/inch tooth thinning. In this case, the helix angle $\psi_2$ is approximately 13 minutes.

The reduction ratios of the offset compound idler configurations of FIGS. 3A through 3D are provided by:

$$\frac{D_{G51}}{D_{P51}}\frac{D_{G52}}{D_{P52}},$$

where $D_{G51}$ and $D_{P51}$ are the diameters of the pitch circle for the teeth of the gear G51 and input pinion P51 of the first stage, and $D_{G52}$ and $D_{P52}$ are the diameters of the pitch circle for the teeth of the gear G52 and the input pinion P52 of the second stage.

Alternatively, the reduction ratios of the offset compound idler configurations of FIGS. 3A through 3D are provided by:

$$\frac{N_{G51}}{N_{P51}}\frac{N_{G52}}{N_{P52}},$$

where $N_{G51}$, $N_{P51}$, $N_{G52}$, $N_{P52}$ are the number of teeth along the pitch circle of the respective pinions and gears.

In the exemplary configuration shown, the teeth counts $N_{G51}$ and $N_{P51}$ are 69 and 16, respectively. These values provide a reduction ratio of the first stage on the order of 4.3. Moreover, the teeth counts $N_{G52}$ and $N_{P52}$ are 111 and 19, respectively. These values provide a reduction ratio of the second stage on the order of 5.84. The reduction ratio of the system 20 is the product of these two reduction values, which is (4.3*5.84):1 and thus on the order of 25:1. With the input shaft 18 rotating at about 104,600 RPM with a power on the order of 70 HP, the two intermediate shafts 13 are rotating at about 24,255 RPM, and the output shaft 22 is rotating at about 4,152 RPM, which is a value suitable for driving the propeller of a small propeller-driven fixed-wing UAV.

Similar designs can be used for different loading conditions. For example, the output shaft 14 of the microturbine engine 12 and the input drive shaft 18 of the transmission system 20 can rotate at about 72,000 RPM with a power on the order of 150 HP. The teeth counts $N_{G51}$, $N_{P51}$, $N_{G52}$ and $N_{P52}$ can be adapted to provide a reduction ratio on the order of 31:1. In this configuration, the output shaft 22 is rotating at about 2,300 RPM, which is a value suitable for driving the propeller of a small propeller-driven fixed-wing UAV. In another example, the output shaft 14 of the microturbine engine 12 and the input drive shaft 18 of the transmission system 20 can rotate at about 227,000 RPM with a power on the order of 5 HP. The teeth counts $N_{G51}$, $N_{P51}$, $N_{G52}$ and $N_{P52}$ can be adapted to provide a reduction ratio on the order of 26:1. In this configuration, the output shaft 22 is rotating at about 8,600 RPM, which is a value suitable for driving the propeller of a small propeller-driven fixed-wing UAV.

Note that the cross section of FIG. 3B is taken through the mesh path as noted in FIG. 3A. This gives the appearance of a large assembly. But, in fact, the intermediate shafts 31 are on the same centerline as the input pinion so that the overall height of the transmission system (without considering the dimensions of the starter-generator 32 and the GEN1 and GEN2 gears and the PUMP gear) is on the order of 7.5 inches. The width of the transmission system is on the order of 7.5 inches. The relative dimensions of the gears of the gear train are provided in FIG. 3A. It is expected that weight and costs of compound idler configurations of FIGS. 3A through 3C will be low as compared to other designs. Thus, it is expected that the compound idler configuration will be advantageous for use in lightweight applications, such as in small fixed-wing propeller-driven UAVs.

The transmission system also requires a lubrication system (not shown). Preferably, the lubrication system includes a conventional oil filter and pump system. The oil pump may be a vane-type pump, gear pump, or a Gerotor pump, which are all well known, that is coupled to the gear train by the PUMP gear of FIG. 3A. Preferably, the PUMP gear and associated oil pump is mounted more or less on the transmission centerline opposite the generator pinion gear GEN2 and the associated starter/generator 32. In addition, the lubrication system preferably includes an air-oil cooler device as is well known. In the event that the oil type, temperature and pressure requirements of the engine and transmission system are similar, the lubrication system of the transmission system may be combined with the lubrication system of the engine as is well known.

For fixed-wing applications, the output shaft 22 of the transmission system 20 is coupled to a propeller. The gyroscopic moment induced by the expected pitch rate and yaw rate and mass moment of inertia of the propeller dictates the size of the output shaft of the transmission system. An exemplary coupler mechanism 26 for coupling the output shaft 22 to a propeller is shown in FIG. 3B. The coupling 26 between the output shaft 22 and the propeller may be integrated into the output shaft 22 for a compact design.

Figure 7A:
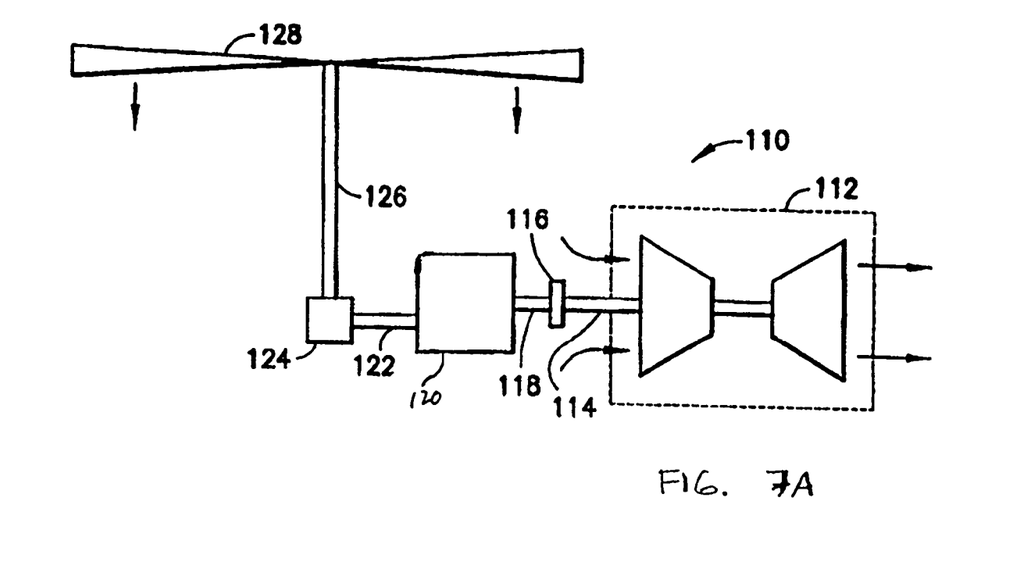
FIG. 7A is a schematic diagram of a vertical lift rotor-based propulsion system, including a microturbine engine and transmission system in accordance with the present invention.
Figure 7B:
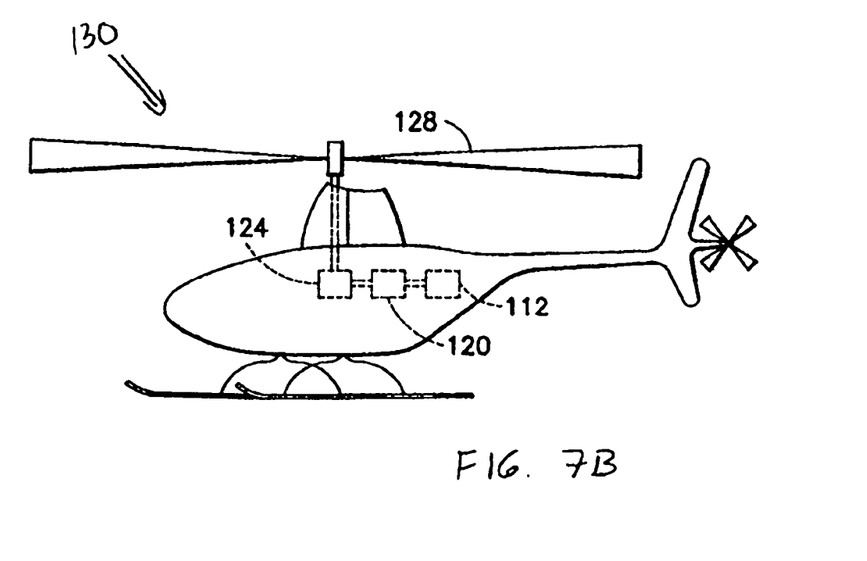
FIG. 7B is a pictorial illustration of an exemplary vertical lift UAV that employs the vertical lift rotor-based propulsion system of FIG. 7A in accordance with the present invention.

The exemplary embodiments of the transmission system (and microturbine-based propulsion system employing such transmission systems) described above are suitable for use in small fixed-wing aircraft applications such as small UAVs. The transmission systems (and microturbine-based propulsion system employing such transmission systems) can also be readily adapted for use in other aircraft applications, such as in small vertical lift aircraft applications as shown in FIGS. 7A and 7B. In such applications, a power plant 110 suitable for use in propelling a vertical-lift aircraft includes a microturbine engine 112 with an output shaft 114. A coupling mechanism 116 couples the output shaft 114 to the input shaft 118 of a transmission system 120. The transmission system 120 operates to reduce the speed of the output shaft 114 of the microturbine engine 112 at its own output shaft 122. The output shaft 122 of the transmission system 120 is coupled to a bevel gear assembly 124 or other suitable drive mechanism that transmits the power of the rotating shaft 122 to a rotating vertical shaft 126. A rotor 128 is coupled to the rotating vertical shaft 126. The rotor 128, when driven by the microturbine engine 112 and transmission system 120, provides thrust that propels an aircraft body, such as the body of the vertical lift aircraft 130 of FIG. 7B. Note that in the configuration shown, the transmission system 120 and bevel gear assembly 124 are disposed on the intake side of the microturbine engine 112. This configuration allows the transmission system 120 and bevel gear assembly 124 to be cooled by the engine inlet air. Alternatively, the transmission system 120 and bevel gear assembly 124 may be disposed on the exhaust side of the microturbine engine 112. In this alternate configuration, the transmission system 120 and bevel gear assembly 124 must operate in a hot environment, and thus must be designed to endure the increased thermal loading that stems from operation in the hot environment on the exhaust side of the engine 112.

The output shaft 114 of the microturbine 112 operates at very high rotational speeds, typically in the range between 50,000 RPM and 250,000 RPM with an output power between 200 HP and 5 HP. For UAV applications, the rotor 128 operates at much slower rotational speeds, typically on the order of 2000 RPM to 7000 RPM. These constraints result in a required reduction ratio from the microturbine engine RPM to the rotor RPM on the order of 25:1 to 36:1. The transmission system 120 and the bevel gear assembly 124 provide this required speed reduction over the output power range (200 HP to 5 HP) of the microturbine engine.

In the preferred embodiment of the present invention, the transmission system 120 as well as the microturbine engine 112 is of small size and low weight. Preferably, the maximum diameter of the transmission system 120 is less than 12 inches. Such size and weight constraints are suitable for use in advanced UAVs.

Moreover, the transmission system 120 is preferably realized by a two-stage offset compound idler designs as described above with respect to FIGS. 3A through 6B. Note that the bevel gear assembly 124 will typically provide a reduction ratio on the order of 2:1 to 3:1. Therefore, the reduction ratio of the two stage offset compound idler designs of FIGS. 3A through 6B as described above are readily adapted to provide for a lower reduction ratio to provide a total reduction ratio on the order of 8:1 to 18:1.

In alternative embodiments, the transmission systems as described herein may comprise any one (or parts of) of a number of configurations, including an in-line lay shaft configuration, an in-line star-star configuration, or an offset star-spur configuration. Such configurations are described in detail in U.S. application Ser. No. 10/756,024, filed on Jan. 12, 2004, commonly assigned to assignee of the present invention and herein incorporated by reference in its entirety. Such configurations preferably provide a reduction ratio having a value preferably greater than 24 for fixed-wing UAV applications. A lower reduction ratio is preferred for vertical-lift UAV applications where a speed-reducing bevel gear is used.

There have been described and illustrated herein several embodiments of a small-size high-speed transmission system and microturbine-based propulsion systems utilizing the improved transmission system. While particular embodiments of the invention have been described, it is not intended that the invention be limited thereto, as it is intended that the invention be as broad in scope as the art will allow and that the specification be read likewise. Thus, while particular shaft speeds, horsepowers and reduction ratios have been disclosed, it will be appreciated that the transmission systems described herein can be readily adapted for use in a broad range of shaft speeds, horsepowers and reduction ratios. For example, the transmission systems described herein may be readily adapted for use with microturbines that operate in the extended range between 50,000 RPM and 250,000 RPM with an output power between 200 HP and 5 HP. In these systems, the reduction ratio provided by the transmission system will likely be increased for certain applications, such as the UAV applications described herein. In addition, while particular types of transmission stages have been disclosed, it will be understood that other well known transmission stage designs can be used. Also, while the transmission system and microturbine-based propulsion system of the present invention are preferably used in conjunction with a propeller to propel a small-size fixed-wing aircraft, it will be appreciated that it will be readily adapted for other small-size aircraft applications, such as vertical-lift aircraft or hybrid tilt-rotor aircraft. Moreover, the transmission system and microturbine-based propulsion system of the present invention may be readily adapted for use in other applications, such as marine propulsion systems, automotive applications, electrical power generations applications, micro-turbine based HVAC applications and hydraulic applications. Finally, the microturbine-based propulsion systems of the present invention may consume a wide variety of fuels, including liquid fuels (such as liquefied natural gas) or gaseous fuels (such as natural gas or propane). It will therefore be appreciated by those skilled in the art that yet other modifications could be made to the provided invention without deviating from its spirit and scope as claimed.

What is claimed is:

1. A transmission system for use with a microturbine engine having an output shaft, the transmission system comprising:
   an input shaft operably coupled to the output shaft of the microturbine engine; and
   a gear train including a first gear and a second gear that interface to one another, the first gear fixed relative to said input shaft and rotating in the same direction as the input shaft, the second gear fixed relative to a counter-rotating shaft and rotating in the opposite direction of said input shaft, wherein the first and second gears employ teeth with first-type and second-type opposite handed helix-angled surfaces, the first-type opposite handed helix-angled surfaces applying axial forces to said input shaft during a normal operation mode where the microturbine engine drives the transmission system and the second-type opposite handed helix-angled surfaces applying axial forces to said input shaft during a start up operation mode where a generator drives the transmission system and microturbine engine, said first-type and second-type opposite handed helix-angled surfaces on respective normal drive sides and normal coast sides of the teeth, and said axial forces pushing the input shaft toward the output shaft of the microturbine engine.

2. A transmission system according to claim 1, wherein:
   said axial forces applied to said input shaft during normal operation by the first-type helix-angled surfaces on respective normal drive sides of the teeth of the first and second gears are greater than the axial force produced by the mass times acceleration of the first gear.

3. A transmission system according to claim 1, further comprising:
   a starter-generator operably coupled to the gear train.

4. A transmission system according to claim 3, wherein:
   said starter-generator is operably coupled to the second gear of the gear train.

5. A transmission system according to claim 4, wherein:
   the gear train includes an idler gear that operably couples said starter generator to the second gear, the idler gear interfacing to the second gear.

6. A transmission system according to claim 5, wherein:
   the gear train includes a pinion gear that is operably coupled to the output of said starter-generator, the pinion gear interfacing to the idler gear.

7. A transmission system according to claim 5, wherein:
   the idler gear and the second gear have opposite handed helical teeth.

8. A transmission system according to claim 1, wherein:
   the input shaft of the transmission system is coupled to the output shaft of the microturbine engine by a coupling that permits axial movement of the input shaft relative to the output shaft.

9. A transmission system according to claim 8, wherein:
   the coupling between the input shaft and the output shaft of the microturbine engine comprises a piloted spline coupler.

10. A transmission system according to claim 9, wherein:
    the coupling between the input shaft and the output shaft of the microturbine engine comprises a polygonal spline coupler.

11. A transmission system according to claim 1, wherein:
said gear train provides a reduction ratio having a value greater than 24.

12. A transmission system according to claim 1, wherein:
output of said gear train is operably coupled to a rotating element for propelling an aircraft body.

13. A transmission system according to claim 12, wherein:
said aircraft body comprises a fixed-wing aircraft body, and said rotating element comprises a propeller.

14. A transmission system according to claim 12, wherein:
said aircraft body comprises a vertical-lift aircraft body, and said rotating element comprises a rotor.

15. A transmission system according to claim 1, wherein:
the gear train comprises at least two speed reduction stages.

16. A transmission system according to claim 15, wherein:
the at least two speed reduction stages comprise an offset compound idler configuration.

17. A transmission system according to claim 1, wherein:
the gear train comprises a self-equilibrating input stage.

18. A transmission system according to claim 17, wherein:
the input shaft is bearingless.

19. A transmission system according to claim 1, wherein:
the input shaft operates at a maximum rotational speed that is greater than 100,000 RPM with an output power between 200 HP and 5 HP.

20. A transmission system according to claim 1, wherein:
the input shaft operates at a maximum rotational speed that is greater than 200,000 RPM with an output power between 200 HP and 5 HP.

21. A transmission system according to claim 1, wherein:
the input shaft operates at a rotational speed in a range between 50,000 RPM and 250,000 RPM with an output power between 200 HP and 5 HP.

22. A propulsion system for an aircraft comprising:
a microturbine engine having an output shaft; and
a transmission system having an input shaft operably coupled to the output shaft of the microturbine engine and a gear train;
wherein the gear train includes a first gear and a second gear that interface to one another, the first gear fixed relative to said input shaft and rotating in the same direction as the input shaft, the second gear fixed relative to a counter-rotating shaft and rotating in the opposite direction of said input shaft, wherein the first and second gears employ teeth with first-type and second-type opposite handed helix-angled surfaces, the first-type opposite handed helix-angled surfaces applying axial forces to said input shaft during a normal operation mode where the microturbine engine drives the transmission system and the second-type opposite handed helix-angled surfaces applying axial forces to said input shaft during a start up operation mode where a generator drives the transmission system and microturbine engine, said first-type and second-type opposite handed helix-angled surfaces on respective normal drive sides and normal coast sides of the teeth, and said axial forces pushing the input shaft toward the output shaft of the microturbine engine.

23. A propulsion system according to claim 22, wherein:
output of said gear train is operably coupled to a rotating element for propelling an aircraft body.

24. A propulsion system according to claim 23, wherein:
said aircraft body comprises a fixed-wing aircraft body, and said rotating element comprises a propeller.

25. A propulsion system according to claim 23, wherein:
said aircraft body comprises a vertical-lift aircraft body, and said rotating element comprises a rotor.

26. An aircraft comprising:
an aircraft body;
a propulsion system including a microturbine engine having an output shaft and a transmission system having an input shaft operably coupled to the output shaft of the microturbine engine and a gear train, wherein the gear train includes a first gear and a second gear that interface to one another, the first gear fixed relative to said input shaft and rotating in the same direction as the input shaft, the second gear fixed relative to a counter-rotating shaft and rotating in the opposite direction of said input shaft, wherein the first and second gears employ teeth with first-type and second-type opposite handed helix-angled surfaces, the first-type opposite handed helix-angled surfaces applying axial forces to said input shaft during a normal operation mode where the microturbine engine drives the transmission system and the second-type opposite handed helix-angled surfaces applying axial forces to said input shaft during a start up operation mode where a generator drives the transmission system and microturbine engine, said first-type and second-type opposite handed helix-angled surfaces on respective normal drive sides and normal coast sides of the teeth, and said axial forces pushing the input shaft toward the output shaft of the microturbine engine; and
a rotating element, operably coupled to said propulsion system for propelling said aircraft body.

27. An aircraft according to claim 26, wherein:
said aircraft body comprises a vertical-lift aircraft body, and said rotating element comprises a rotor.

28. An aircraft according to claim 26, wherein:
said aircraft body comprises a fixed-wing aircraft body, and said rotating element comprises a propeller.

* * * * *

UNITED STATES PATENT AND TRADEMARK OFFICE
CERTIFICATE OF CORRECTION

PATENT NO. : 7,575,192 B1　　　　　　　　　　　　　　　　　　　　　Page 1 of 1
APPLICATION NO. : 11/305711
DATED : August 18, 2009
INVENTOR(S) : Jules G. Kish It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 859 days.

Signed and Sealed this

Seventh Day of September, 2010

David J. Kappos
*Director of the United States Patent and Trademark Office*